(12) United States Patent
Mittal et al.

(10) Patent No.: US 10,489,393 B1
(45) Date of Patent: Nov. 26, 2019

(54) QUASI-SEMANTIC QUESTION ANSWERING

(71) Applicant: Amazon Technologies, Inc., Seattle, WA (US)

(72) Inventors: Arpit Mittal, Cambridge (GB); Petra Elisabeth Holmes, Over (GB); Dianhuan Lin, Cambridge (GB); Mihai Valentin Tablan, Cambridge (GB)

(73) Assignee: Amazon Technologies, Inc., Seattle, WA (US)

( * ) Notice: Subject to any disclaimer, the term of this patent is extended or adjusted under 35 U.S.C. 154(b) by 670 days.

(21) Appl. No.: 15/084,781

(22) Filed: Mar. 30, 2016

(51) Int. Cl.
| | | |
|---|---|---|
| *G06F 16/242* | (2019.01) | |
| *G10L 15/26* | (2006.01) | |
| *G06F 17/27* | (2006.01) | |
| *G06F 16/2455* | (2019.01) | |
| *G06F 16/9038* | (2019.01) | |
| *G06F 16/2452* | (2019.01) | |

(52) U.S. Cl.
CPC ........ *G06F 16/243* (2019.01); *G06F 16/2455* (2019.01); *G06F 16/24522* (2019.01); *G06F 16/9038* (2019.01); *G06F 17/271* (2013.01); *G10L 15/265* (2013.01)

(58) Field of Classification Search
CPC ........... G06F 17/3053; G06F 17/30554; G06F 17/30864; G06F 17/30528; G06F 17/30312; G06F 17/30401; G06F 16/9038; G06F 16/2455; G06F 16/24522
USPC ................................................. 707/723, 756
See application file for complete search history.

(56) References Cited

U.S. PATENT DOCUMENTS

| | | | | |
|---|---|---|---|---|
| 6,154,758 A | * | 11/2000 | Chiang | G06F 17/21 715/263 |
| 8,185,539 B1 | * | 5/2012 | Bhardwaj | G06F 17/30985 707/756 |
| 9,336,782 B1 | * | 5/2016 | Patel | G10L 13/033 |
| 10,025,447 B1 | * | 7/2018 | Dixit | G06F 3/048 |
| 2003/0129571 A1 | * | 7/2003 | Kim | G09B 19/06 434/156 |
| 2008/0066080 A1 | * | 3/2008 | Campbell | G06F 17/3089 719/314 |
| 2010/0036660 A1 | * | 2/2010 | Bennett | G10L 15/30 704/231 |
| 2014/0324648 A1 | * | 10/2014 | Mori | G06Q 40/123 705/31 |
| 2015/0334065 A1 | * | 11/2015 | Yan | H04W 4/21 709/206 |

(Continued)

*Primary Examiner* — Dung K Chau
(74) *Attorney, Agent, or Firm* — Pierce Atwood LLP

(57) ABSTRACT

A voice-controlled question answering system that uses both a knowledge base and a detailed index of other sources that may be accessible over the Internet. The knowledge base is used to answer questions of more general interest whose answers are contained in the knowledge base. The index is used to answer more complex questions that are not answerable using the knowledge base. Web and other sources are analyzed to create the index, where text segments are indexed along with data describing the text segments in a quasi-semantic way. Quasi-semantic features are extracted from incoming spoken questions and used, along with machine learning trained models, to identify an indexed text segment that includes the answer to the question. The text segment may then be rearranged or simply passed to a speech synthesizer so the answer may be spoken aloud to a user.

20 Claims, 10 Drawing Sheets

(56) References Cited

U.S. PATENT DOCUMENTS

2018/0011838 A1* 1/2018 Beller .............. G06F 17/30654

* cited by examiner

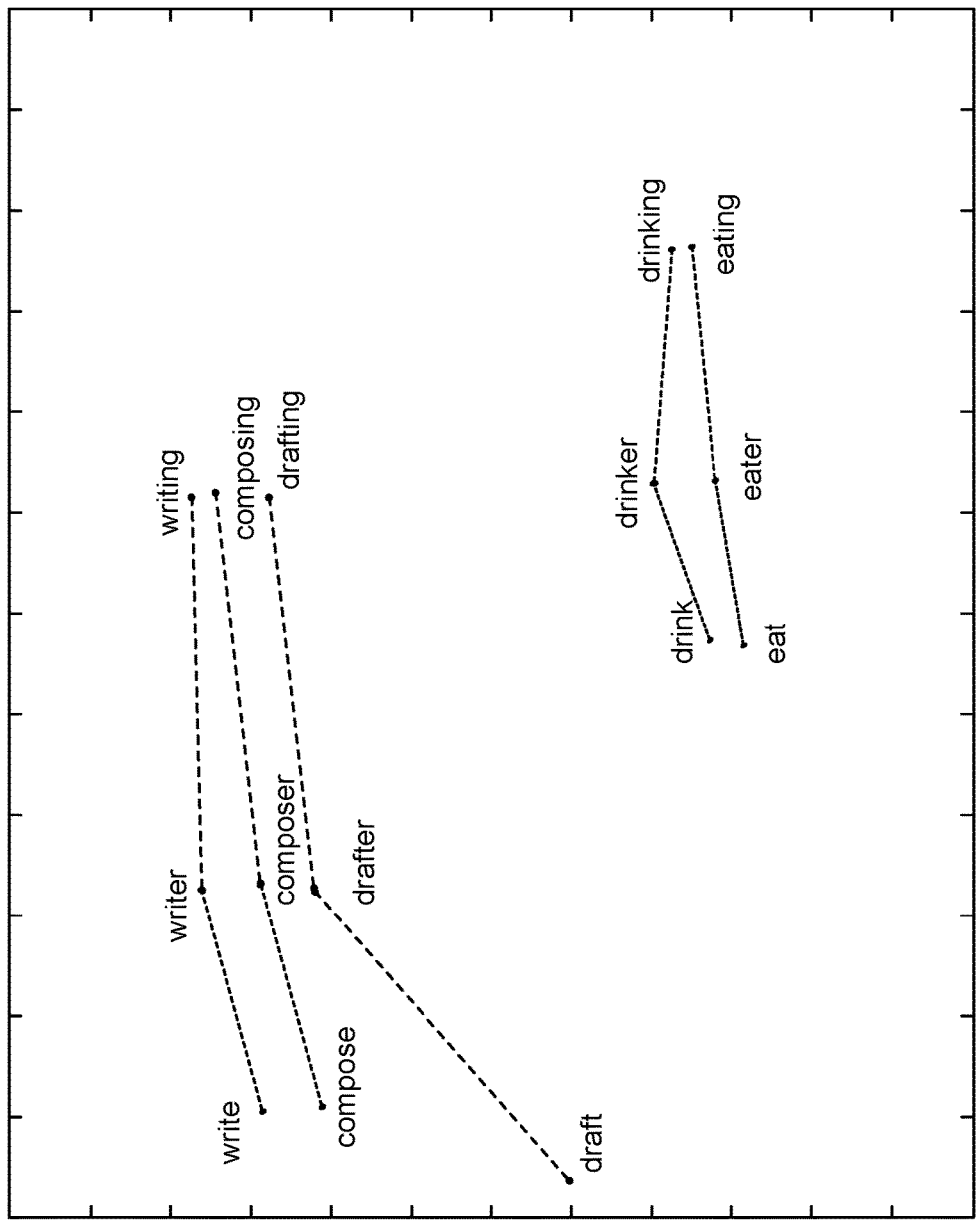

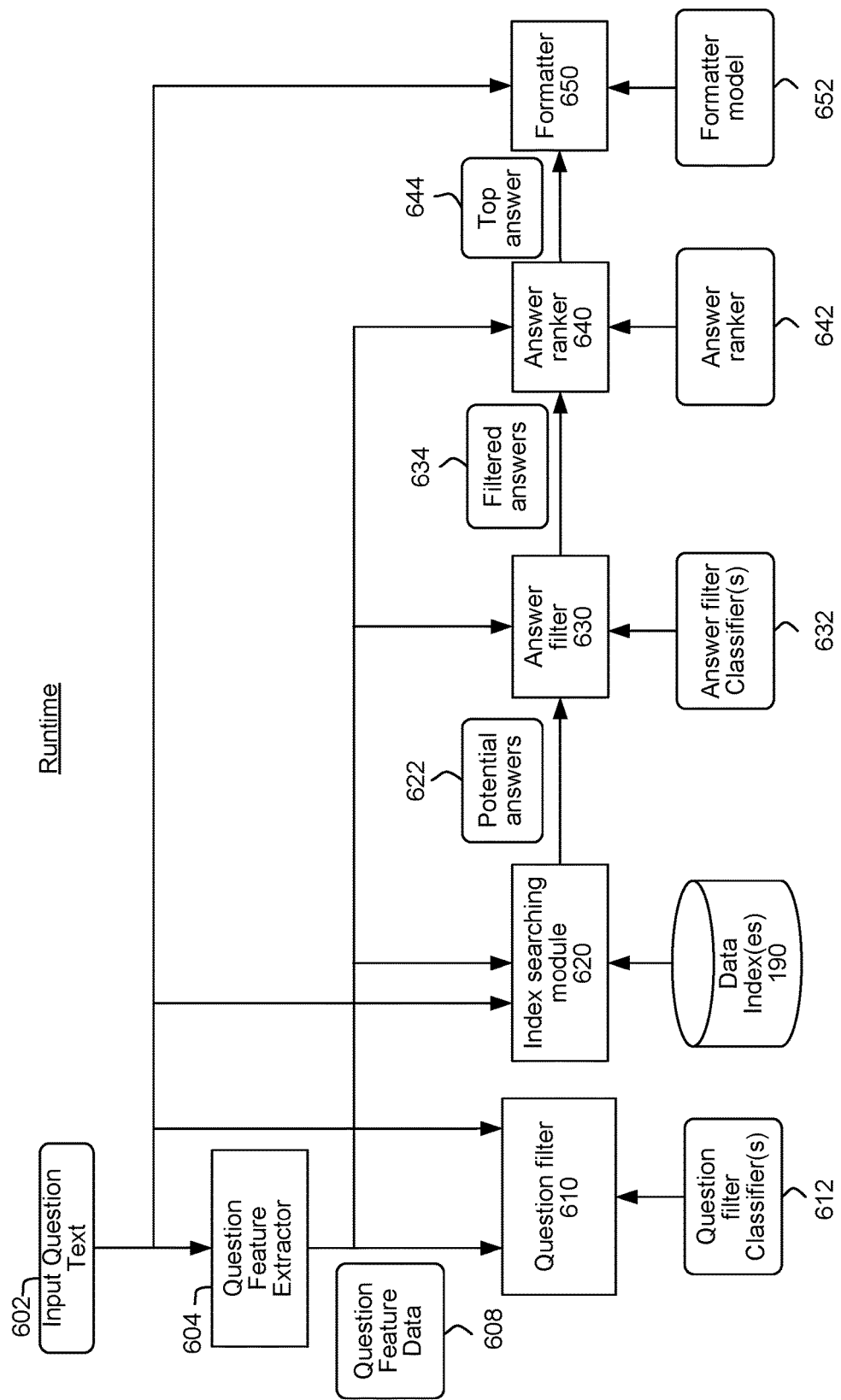

QUASI-SEMANTIC QUESTION ANSWERING

BACKGROUND

Speech recognition systems have progressed to the point where humans can interact with computing devices entirely relying on speech. Such systems employ techniques to identify the words spoken by a human user based on the received audio input. Speech recognition combined with natural language understanding processing techniques enable speech-based user control of a computing device to perform tasks based on the user's spoken commands. Speech recognition may also include converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 4 illustrates representations of word usage similarity in a vector space.

FIG. 6 illustrates quasi-semantic question answering according to embodiments of the present disclosure.

DETAILED DESCRIPTION

Figure 1:
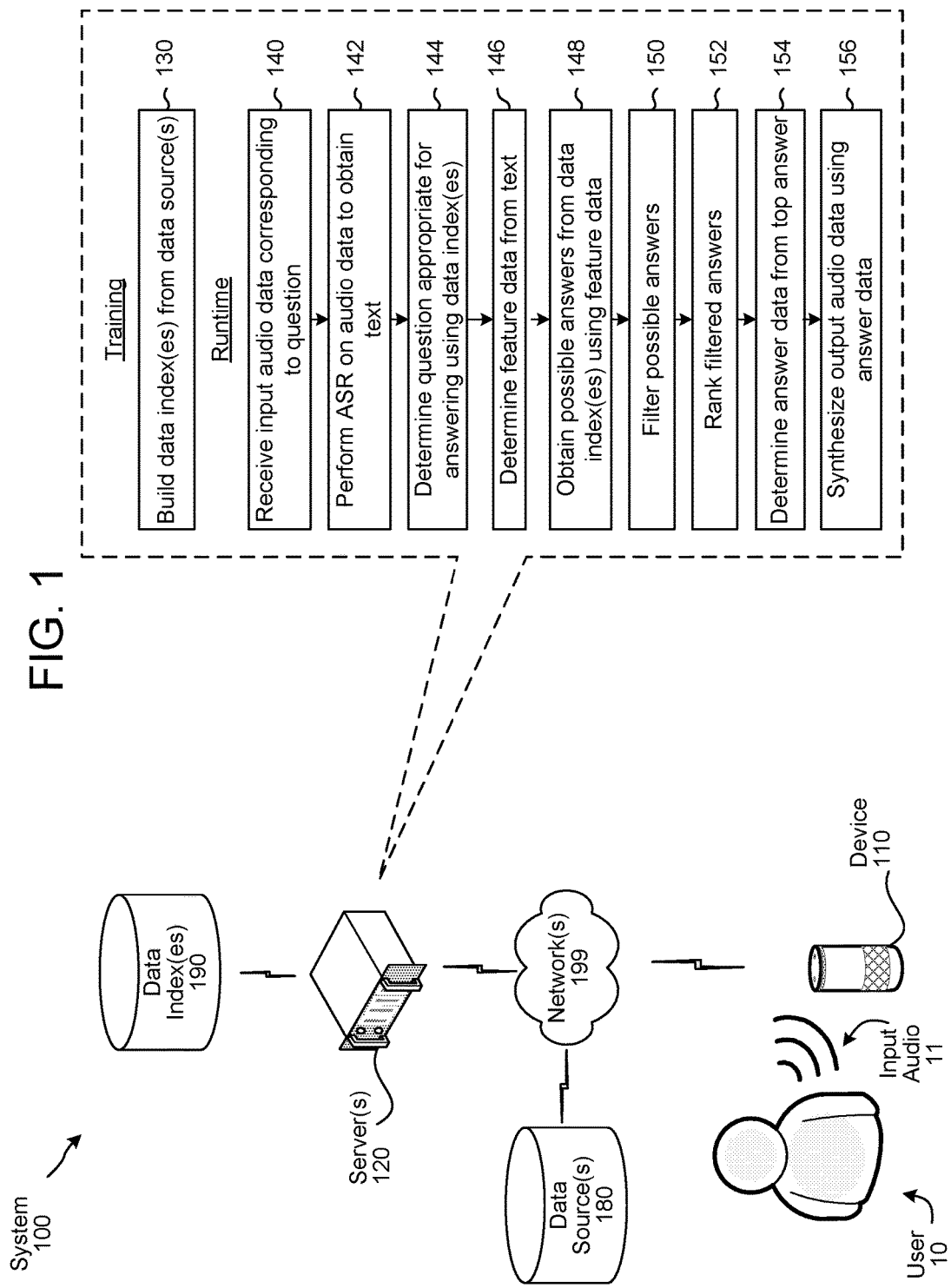
FIG. 1 illustrates a quasi-semantic question answering system according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. The combination of ASR and NLU is commonly referred to as speech processing.

ASR and NLU can be computationally expensive. That is, significant computing resources may be needed to process ASR and NLU processing within a reasonable time frame. Because of this, a distributed computing environment may be used when performing speech processing. An example of such a distributed environment may involve a local device having one or more microphones being configured to capture sounds from a user speaking and circuitry configured to convert those sounds into an audio signal. The audio signal/data may then be sent to a downstream remote device for further processing, such as for converting the audio signal into an ultimate command. The command may then be executed by a remote and/or (the) local device(s) depending on the command itself.

In certain situations, a user utterance may include a question to be answered by the system. That is, the user may ask the system to provide some information in response to the utterance. The ultimate command in this example would be to provide the information requested. As part of NLU processing, in order to respond to a user's query, the system may rely on a knowledge base to obtain or confirm information requested by the query. A knowledge base is a data store that includes facts organized in a particular manner that may be used to respond to user queries. A knowledge base may include a collection of tuples and may encode formal semantics on the data stored within the knowledge base. The knowledge base may also include a schema (for example defined by classes and properties) to organize its data. In order to retrieve answer data from a knowledge base, a query may first be parsed and new data generated in a form recognizable by the knowledge base.

There are many types of queries that a user may pose from simple single-fact questions (for example, "what is the capital of France?") to more detailed questions involving time, place, multiple entities, etc. (for example, "when was Tom Cruise married to Nicole Kidman?"). Query resolution systems may rely on a rule/template based approach. In such an approach, a series of rules may be used to analyze the incoming query text to identify the intent of the query (i.e., what information is being sought) and what entities are named in the query that are needed to provide the desired information. In a rule/template based approach, rules may be applied to query text, where the results of each rule's processing may be given a confidence score where the rule results corresponding to a highest confidence score are selected, parsed and passed on to the knowledge base.

One benefit to using a knowledge base to answer user queries is that the knowledge base may be curated, thus ensuring that the information in the knowledge base is sufficiently reliable. One drawback to using a knowledge base, is that not all questions will be answerable using the knowledge base, either because the knowledge base does not include sufficient information to answer the question, or because the question as posed in the utterance is not sufficiently clear that it can be parsed into a form the knowledge base understands. Specifically, in order to form a query to the knowledge base the system may perform NLU processing to make a sematic understanding of the question and the information being sought, so the system can formulate the query to the knowledge base to obtain the desired question. Enabling a computing system to undertake a semantic understanding of every potential question would be technically challenging.

An alternative to a knowledge base query is a web query, where a search string is input into a search engine. However the result for such web queries often take the form of a list of Internet links rather than an answer to a specific question, and further web queries make no effort at any semantic understanding, relying instead on a solely keyword based search approach.

Offered is a question answering system that incorporates a knowledge base but also engages in quasi-semantic question answering to handle questions that can't be answered using the knowledge base alone. To configure the system, information is obtained from various data sources (such as internet sources, public databases, etc.). The information is separated into sections, such as sentences, and indexed according to different data features of the specific sentences. Such data features may include keywords, subject-object-relation triples, word embeddings, or other features as described below. The features and sentences are then stored in one or more indexes operated by the system. If a question is posed to the system that is not answerable by the knowledge base, the system parses the question text to obtain values for the same or similar features to those stored in the index, thus giving the system a quasi-semantic understanding of the question. The system then compares those features to the data index(es) (may perform other layers of processing discussed below) and finds a sentence that matches. Alternately, the system may not find a match and may return an indication that a match cannot be found. If a match is found, the system can then return the matching sentence (either in the form it was found on the Internet or in a rephrased form) to the user as the answer to the user's question. If the question was posed to the system as part of a voice-controlled interaction the system may take the sentence and synthesize audio data including speech of the answer using text-to-speech processing, and send the audio data to a local device for playback to a user (further improving over the list-based search results provided by search engines).

This combined approach of answering questions allows the system to answer both questions that call for information in, and are parsable into a form understood by, a knowledge base (for example "what is the capital of France?" or "who was the first President of the United States?") as well as more complex questions that are difficult to parse or whose answers may not be in a knowledge base but may be found on the Internet or in other sources (for example "how many black keys are there in a piano?" or "who was the American music promoter who brought the Beatles to play in Shea Stadium?").

FIG. 1 shows a system 100 configured to use a quasi-semantic approach to question answering. Although FIG. 1, and lower figures/discussion, illustrate the operation of the system in a particular order, the steps described may be performed in a different order (as well as certain steps removed or added) without departing from the intent of the disclosure. As shown in FIG. 1, a system 100 may include one or more devices 110 local to user(s) 10, as well as one or more networks 199 and one or more servers 120 connected to device 110 across network(s) 199. The server(s) 120 (which may be one or more different physical devices) may be capable of performing traditional speech processing (such as ASR, NLU, question parsing, etc.) as described herein. A single server may be capable of performing all speech processing or multiple server(s) 120 may combine to perform the speech processing. Further, the server(s) 120 may be configured to execute certain commands, such as answering queries spoken by user 10. In addition, certain speech detection or command execution functions may be performed by device 110.

As shown in FIG. 1, during a training process the system builds (130) data indexes 190 from a variety of data sources 180. The data sources 180 may be Internet sources or other electronic data sources, such as those available over network 199 or otherwise. The system 100 also processes the data from the data sources 180 to obtain feature data corresponding to the various sentences and obtained content. The feature data is stored by the system 100 and may also be used to index and refer to the data as stored in the data indexes 190. During the training phase the system may also train (not shown) various machine learning classifiers/models that can be used to perform various operations at runtime.

At runtime a user 10 may speak an utterance (represented by input audio 11) including a question to a local device 110. The device 110 may convert the audio 11 into audio data 111 and send the audio data to the server(s) 120. The server(s) 120 may then receive (140) the input audio data corresponding to the question and perform (142) ASR processing on the audio data to obtain text. The server(s) 120 may then determine (144) whether the question is appropriate for a quasi-semantic answering approach using the data index(es) 190. This system may use a machine learning model to determine whether the question is appropriate. The system may then determine (146) feature data from the text of the question. The feature data may be the kinds of data used to index the data in the data index(es) 190. The system may then determine (not shown) which data index 190 is likely to obtain an answer to the question. This determination may also use one or more machine learning model(s) to compare the question text and/or feature data to particular data index(es) 190. The system may then obtain (148) possible answers from the data index(es) using the feature data. Obtaining the answers may also use a machine learning model. Another machine learning model may be used by the server 120 to filter (150) the possible answers to remove answers that are unlikely to be responsive to the question. A different machine learning model may then be used by the server 120 to rank (152) the filtered answers. The top ranked answer may then be used to determine (154) answer data, which may be the text of the top ranked answer or may be a reformed version of the text of the top ranked answer. The system may then synthesize (156) audio data using the answer data. The audio data may then be sent from the server 120 to the local device 110 for playback to the user 10.

Figure 2:
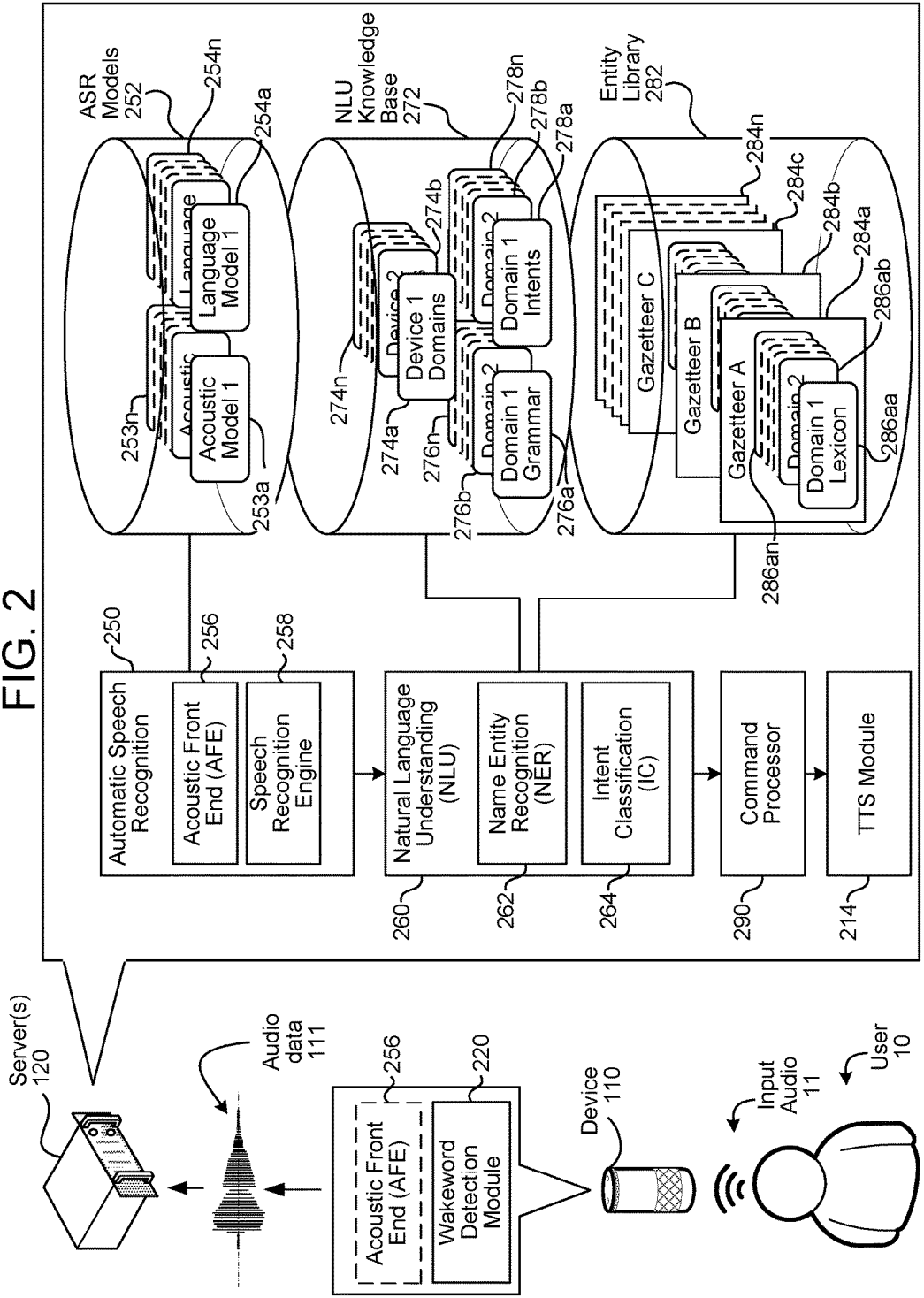
FIG. 2 is a conceptual diagram for processing spoken questions/commands according to embodiments of the present disclosure.

Further details of the quasi-semantic question answering system are discussed below, following a discussion of the overall speech processing system of FIG. 2. FIG. 2 is a conceptual diagram of how a spoken utterance is traditionally processed, allowing a system to capture and execute commands spoken by a user, such as spoken commands that may follow a wakeword. The various components illustrated may be located on a same or different physical devices. Communication between various components illustrated in FIG. 2 may occur directly or across a network 199. An audio capture component, such as a microphone of device 110, captures audio 11 corresponding to a spoken utterance. The device 110, using a wakeword detection module 220, then processes the audio, or audio data corresponding to the audio, to determine if a keyword (such as a wakeword) is detected in the audio. Following detection of a wakeword, the device sends audio data 111 corresponding to the utterance, to a server 120 that includes an ASR module 250. The audio data 111 may be output from an acoustic front end (AFE) 256 located on the device 110 prior to transmission. Or the audio data 111 may be in a different form for processing by a remote AFE 256, such as the AFE 256 located with the ASR module 250.

The wakeword detection module 220 works in conjunction with other components of the device, for example a microphone (not pictured) to detect keywords in audio 11. For example, the device 110 may convert audio 11 into audio data, and process the audio data with the wakeword detection module 220 to determine whether speech is detected, and if so, if the audio data comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the device 110 (or separately from speech detection), the device 110 may use the wakeword detection module 220 to perform wakeword detection to determine when a user intends to speak a command to the device 110. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 220 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 110 may "wake" and begin transmitting audio data 111 corresponding to input audio 11 to the server(s) 120 for speech processing. Audio data corresponding to that audio may be sent to a server 120 for routing to a recipient device or may be sent to the server for speech processing for interpretation of the included speech (either for purposes of enabling voice-communications and/or for purposes of executing a command in the speech). The audio data 111 may include data corresponding to the wakeword, or the portion of the audio data corresponding to the wakeword may be removed by the local device 110 prior to sending. Further, a local device 110 may "wake" upon detection of speech/spoken audio above a threshold, as described herein. Upon receipt by the server(s) 120, an ASR module 250 may convert the audio data 111 into text. The ASR transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model storage 252c. For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 256 and a speech recognition engine 258. The acoustic front end (AFE) 256 transforms the audio data from the microphone into data for processing by the speech recognition engine. The speech recognition engine 258 compares the speech recognition data with acoustic models 253, language models 254, and other data models and information for recognizing the speech conveyed in the audio data. The AFE may reduce noise in the audio data and divide the digitized audio data into frames representing a time intervals for which the AFE determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 258 may process the output from the AFE 256 with reference to information stored in speech/model storage (252). Alternatively, post front-end processed data (such as feature vectors) may be received by the device executing ASR processing from another source besides the internal AFE. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as server 120, for natural language understanding (NLU) processing, such as conversion of the text into commands for execution, either by the device 110, by the server 120, or by another device (such as a server running a specific application like a search engine, etc.).

The device performing NLU processing 260 (e.g., server 120) may include various components, including potentially dedicated processor(s), memory, storage, etc. A device configured for NLU processing may include a named entity recognition (NER) module 252 and intent classification (IC) module 264, a result ranking and distribution module 266, and knowledge base 272. The NLU process may also utilize gazetteer information (284a-284n) stored in entity library storage 282. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process takes textual input (such as processed from ASR 250 based on the utterance 11) and attempts to make a semantic interpretation of the text. That is, the NLU process determines the meaning behind the text based on the individual words and then implements that meaning. NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom."

The NLU may process several textual inputs related to the same utterance. For example, if the ASR 250 outputs N text segments (as part of an N-best list), the NLU may process all N outputs to obtain NLU results.

the NLU process may be configured to parsed and tagged to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result).

To correctly perform NLU processing of speech input, the NLU process 260 may be configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition module 262 receives a query in the form of ASR results and attempts to identify relevant grammars and lexical information that may be used to construe meaning. To do so, a name entity recognition module 262 may begin by identifying potential domains that may relate to the received query. The NLU knowledge base 272 includes a databases of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

A domain may represent a discrete set of activities having a common theme, such as "shopping", "music", "calendaring", etc. As such, each domain may be associated with a particular language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

A query is processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result.

An intent classification (IC) module 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278.

In order to generate a particular interpreted response, the NER 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 260 may parse the query to identify words as subject, object, verb, preposition, etc., based on grammar rules and models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 260 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. No determination has been made as to the meaning of "mother's little helper" and "the rolling stones," but based on grammar rules and models, it is determined that these phrase relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the a slot/field using gazetteer information, the NER module 262 may search the database of generic words associated with the domain (in the NLU's knowledge base 272). So for instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried, potentially producing two different results.

The comparison process used by the NER module 262 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER modules 262 may also use contextual operational rules to fill slots. For example, if a user had previously requested to pause a particular song and thereafter requested that the voice-controlled device to "please un-pause my music," the NER module 262 may apply an inference-based rule to fill a slot associated with the name of the song that the user currently wishes to play—namely the song that was playing at the time that the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 290, which may be located on a same or separate server 120 as part of system 100. The destination command processor 290 may be determined based on the NLU output. For example, if the NLU output includes a command to play music, the destination command processor 290 may be a music playing application, such as one located on device 110 or in a music playing appliance, configured to execute a music playing command. If the NLU output includes a search request, the destination command processor 290 may include a search engine processor, such as one located on a search server, configured to execute a search command.

In certain configurations device 110 is a speech controlled device whose primary input/output is speech, either from the user to provide inputs/queries to the system, or by the system to respond to the user (such as answering a query) in the form of a synthesized speech output. Such spoken interactions may be common, for example, with headless devices that lack a keyboard, touchscreen, or other input/output mechanisms, though speech control may be used with many different device types.

To create output speech, the system may be configured with a text-to-speech (TTS) module 214 that transforms input text data (for example the text from command processor 290, from knowledge base 272 or from some other source) into audio data representing speech. The audio data may then be sent to device 110 for playback to the user, thus creating the output speech. The TTS module 214 may include a TTS storage for converting the input text into speech. The TTS module 214 may include its own controller(s)/processor(s) and memory or may use the controller/processor and memory of the server(s) 120 or other device, for example. Similarly, the instructions for operating the TTS module 214 may be located within the TTS module 214, within the memory and/or storage of the server(s) 120 or within an external device.

Text input into a TTS module 214 may be processed to perform text normalization, linguistic analysis, and linguistic prosody generation. During text normalization, the TTS module 214 processes the text input and generates standard text, converting such things as numbers, abbreviations (such as Apt., St., etc.), symbols ($, %, etc.) into the equivalent of written out words.

During linguistic analysis the TTS module 214 analyzes the language in the normalized text to generate a sequence of phonetic units corresponding to the input text. This process may be referred to as phonetic transcription. Phonetic units include symbolic representations of sound units to be eventually combined and output by the system as speech. Various sound units may be used for dividing text for purposes of speech synthesis. The TTS module 214 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage. The linguistic analysis performed by the TTS module 214 may also identify different grammatical components such as prefixes, suffixes, phrases, punctuation, syntactic boundaries, or the like. Such grammatical components may be used by the TTS module 214 to craft a natural sounding audio waveform output. The language dictionary may also include letter-to-sound rules and other tools that may be used to pronounce previously unidentified words or letter combinations that may be encountered by the TTS module 214. Generally, the more information included in the language dictionary, the higher quality the speech output.

Based on the linguistic analysis, the TTS module 214 may then perform linguistic prosody generation where the phonetic units are annotated with desired prosodic characteristics, also called acoustic features, which indicate how the desired phonetic units are to be pronounced in the eventual output speech. During this stage the TTS module 214 may consider and incorporate any prosodic annotations that accompanied the text input. Such acoustic features may include pitch, energy, duration, and the like. Application of acoustic features may be based on prosodic models available to the TTS module 214. Such prosodic models indicate how specific phonetic units are to be pronounced in certain circumstances. A prosodic model may consider, for example, a phoneme's position in a syllable, a syllable's position in a word, a word's position in a sentence, phrase, or paragraph, neighboring phonetic units, etc. As with the language dictionary, prosodic models with more information may result in higher quality speech output than prosodic models with less information. As can be appreciated, when a larger portion of a textual work is made available to the TTS module 214, the TTS module 214 may assign more robust and complex prosodic characteristics that vary across the portion, thus making the portion sound more human/resulting in higher quality audio output.

The TTS module 214 may generate a symbolic linguistic representation, which may include a sequence of phonetic units annotated with prosodic characteristics. This symbolic linguistic representation may then be converted into an audio waveform of speech for output to an audio output device (such as a microphone) and eventually to a user. The TTS module 214 may be configured to convert the input text into high-quality natural-sounding speech in an efficient manner. Such high-quality speech may be configured to sound as much like a human speaker as possible, or may be configured to be understandable to a listener without attempts to mimic a specific human voice.

The TTS module 214 may perform speech synthesis using one or more different methods. In one method of synthesis called unit selection, described further below, the TTS module 214 matches the symbolic linguistic representation against a database of recorded speech, such as a database of a voice corpus. The TTS module 214 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (such as its pitch, energy, etc.), as well as other information, such as where the phonetic unit appears in a word, sentence, or phrase, the neighboring phonetic units, etc. Using all the information in the unit database, the TTS module 214 may match units (for example in a unit database) to the input text to create a natural sounding waveform. The unit database may include multiple examples of phonetic units to provide the system with many different options for concatenating units into speech. One benefit of unit selection is that, depending on the size of the database, a natural sounding speech output may be generated. As described above, the larger the unit database of the voice corpus, the more likely the system will be able to construct natural sounding speech.

In another method of synthesis, called parametric synthesis, parameters such as frequency, volume, noise, are varied by the TTS module 214 to create an artificial speech waveform output. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also produces an output speech quality that may not match that of unit selection. Unit selection and parametric techniques may be performed individually or combined together and/or combined with other synthesis techniques to produce speech audio output.

Parametric speech synthesis may be performed as follows. The TTS module 214 may include an acoustic model, or other models, which may convert a symbolic linguistic representation into a synthetic acoustic waveform of the text input based on audio signal manipulation. The acoustic model includes rules may be used to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation.

A number of techniques may be used to match speech to be synthesized with input phonetic units and/or prosodic annotations. One common technique is using Hidden Markov Models (HMMs). HMMs may be used to determine probabilities that audio output should match textual input. HMMs may be used to translate parameters from the linguistic and acoustic space to the parameters to be used by a vocoder (a digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed, the state may change or stay the same, based on the processing of the new text. For example, the pronunciation of a previously processed word might change based on later processed words. A Viterbi algorithm may be used to find the most likely sequence of states based on the processed text. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, HNM (harmonic plus noise model) based vocoders, CELP (code-excited linear prediction) vocoders, GlottHMM vocoders, HSM (harmonic/stochastic model) vocoders, or others.

The TTS module 214 may be configured to perform TTS processing in multiple languages. For each language, the TTS module 214 may include specially configured data, instructions and/or components to synthesize speech in the desired language(s). To improve performance, the TTS module 214 may revise/update the contents of the TTS storage based on feedback of the results of TTS processing, thus enabling the TTS module 214 to improve TTS processing.

Other information may also be stored in the TTS storage for use in TTS processing. The contents of the TTS storage may be prepared for general TTS use or may be customized to include sounds and words that are likely to be used in a particular application. For example, for TTS processing by a global positioning system (GPS) device, the TTS storage may include customized speech specific to location and navigation. In certain instances the TTS storage may be customized for an individual user based on his/her individualized desired speech output. For example a user may prefer a speech output voice to be a specific gender, have a specific accent, speak at a specific speed, have a distinct emotive quality (e.g., a happy voice to correspond to a happy moment in the literary work), or other customizable characteristic. The TTS module 214 may include specialized databases or models to account for user preferences.

For example, to create the customized speech output of the system, the system may be configured with multiple voice corpuses/unit databases, where each unit database is configured with a different "voice" to match desired speech qualities. The voice selected by the TTS module 214 to synthesize the speech may correspond to a character in the literary work. For example, one voice corpus may be stored to be used to synthesize a 1st male character's speech, another may be stored to be used to synthesize a 1st female's character, and so on. Thus the audio of each customized voice corpus matches the respective desired speech quality. The customized voice corpuses may then be used during runtime to differentiate different characters in the literary work. Additionally, parametric synthesis may be used to synthesize speech with the desired speech quality. For parametric synthesis, parametric features may be configured that match the desired speech quality. The application may also offer a user certain pre-programmed choices of types of sounds that the system may provide.

A voice-controlled question answering system may make use of all the various components discussed above to receive a question from a user, convert that question to audio data, receive and perform ASR on the audio data to identify text, perform NLU on the text to determine a question in the text, formulate a query to the knowledge base using the text, retrieve an answer from the knowledge base, formulate answer data using the answer, perform TTS on the answer data to create output audio data including the answer, send the output audio data to the local device and play the output audio data back to a user. It is desirable, as discussed above, to implement a quasi-semantic question answering approach to supplement the use of the knowledge base to respond to user questions. Such as supplemental approach will expand the overall ability of the system to respond to more obscure user questions that are unanswerable by the knowledge base.

Figure 3:
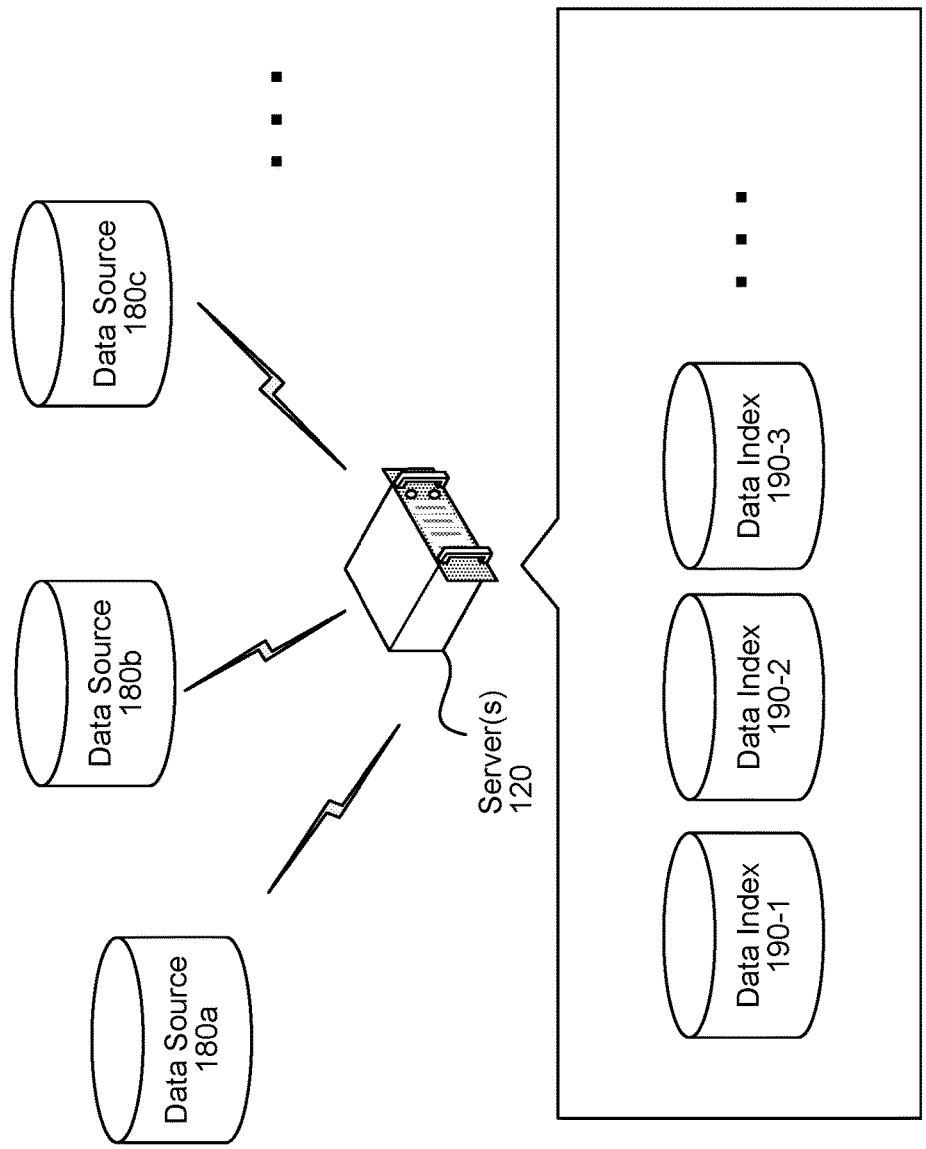
FIG. 3 illustrates indexing content from data sources according to embodiments of the present disclosure.

To enable the supplemental answering approach the system may build one or more data indexes 190 that may be referenced by the system to attempt to answer a user's question. The data indexes 190 may be configured during a training phrase that is performed prior to runtime operations when a question is answered. To build the data indexes 190, the system may access other sources of data, such as different data sources 180, as illustrated in FIG. 3. The data sources 180 may be any variety of data source. The data sources 180 may be of general subject matter or may be specific to a domain (e.g., music, trivia, sports, politics, etc.). A domain specific data source may be useful in identifying answers that are specific to a domain of interest to the user. For example, if the system regularly processes questions in a music domain a music-associated data source may be useful in answering complex questions in the music domain. As the server 120 gathers data from new data sources it may store the data from a data source in one or more data indexes 190. The system may organize data indexes in a number of different ways. For example the server 120 may create a single comprehensive data index 190 or may create multiple data indexes, illustrated as 190-1, 190-2, and so forth. One data index may include data corresponding to a single data source, or one data index may include data from multiple data sources. Data indexes may be configured by domain or knowledge area, or using some other organization.

A data index may store the text obtained from the data source. The text stored in the data index may not include all text obtained from the data source, but rather may only include text segments the system determines may have value for purposes of later question answering. The text segments may be sentence fragments, sentences, multiple sentences or other length text segments. The system may use NLP techniques, machine learning (ML) techniques as well as keyword matching to identify text segments that are of interest to the system. The system may filter out text segments that do not correspond to the intended use (for example, non-factual segments, segments that express opinions, or the like). The system may also filter out text segments that are too long and would not provide a desirable user experience if used to answer a spoken question. Similarly, the system may also filter out text segments that are too short and are thus unlikely to contain enough context to match an incoming query. The system may also filter out text segments that include reference to too many entities, as such text segments may be unfocused for purposes of query answering. Other filtering may also take place.

Along with the text segments, the data index stores information about the text segments in the form of feature data, where the feature data represents values for certain features of the respective text segment the system may use later in answering user questions. Thus feature data of a text segment describes characteristics of the text segment and the words of the text segment. The feature data for a text segment is stored and indexed in a manner associated with the respective text segment for later processing by the system.

Many different types of feature data may be indexed by the server. One example of a feature is a word embedding. A word embedding is a representation of how a word (or string of words) is used in language, as may be represented by how a word is used in a word corpus (i.e., collection of text) or plurality of word corpuses. Such word embedding data may enable the system to determine synonyms of words or otherwise rearrange words when processing/answering an incoming question. To determine a word embedding or word usage data, using the data from one or more data sources 180, the system may analyze individual words and their respective usages. The usage characteristics for a particular word may be specific to a single data source 180 or may represent usage of the word as it appears over multiple data sources 180. Usage characteristics corresponding to a word may be tracked and represented in a number of different ways. One way of representing word usage characteristics is with a data vector, where the data vector includes a number of characteristics representing how the word is used. For example, the vector may include characteristics indicating how often another word is used next to the subject word, how often the other word is used two words away from the subject word, etc. As can be appreciated, such vectors may become large, with thousands of characteristics resulting in thousands of data values (called dimensions) for each vector. The particular size of the vector may be configurable depending on the characteristics the system will evaluate when considering the usage of any particular word. Further, even with very large vectors, only certain dimensions of each vector may be evaluated when considering the usage of any particular word. Further, vector dimensionality reduction techniques may be applied to produce dense and shorter vectors which the system can then use. With vectors available for each word of interest to the system (for example, all or some portion of the words in a data sources 180, ASR lexicon, or the like) the usage characteristics (e.g., usage vectors) may be compared against each other to determine which usage characteristics/vectors are similar. Similar word usage characteristics/vectors may indicate similar usages between individual words.

The system may then map multiple vectors, each corresponding to the usage of a particular word, into a vector space. Given the number of dimensions for each vector, the vector space may be a high dimensional vector space. A number of known techniques for manipulating vectors in high dimensional (or other) vector space may be used to compare analyze vectors and compare vectors to each other. One example for representing and analyzing word usage characteristic as vectors is the GloVe: Global Vectors for Word Representation project by Jeffery Pennington, Richard Socher, and Christopher D. Manning of the Computer Science Department of Stanford University published in 2014, though other techniques may be used. Further, vectors are one example of tracking and comparing word usage characteristics, other techniques may be used.

Representing words in a vector space may be useful for showing the relationship between usage of individual words, as well as showing the relationship between usage of variations of a particular word and showing the relationship between the same usage variation across different word roots. Thus, a vector space may be used to represent sematic relationships between words as geometric relationship between vectors. For example, FIG. 4 illustrates a number of words in a hypothetical vector space where each point represents the vector location for the particular word. Although illustrated as located in a two-dimensional graph for discussion purposes, the usage vectors for the words illustrated in FIG. 4 would be in a high dimensional space. Further, FIG. 4 is shown for example purposes only and the vector locations/relationships do not necessarily reflect a true graphing of the usage of the illustrated words.

As illustrated in FIG. 4, certain words that have similar meaning may be close to each other in the vector space (indicating a similarity of usage characteristics). Also, certain words that have different meanings may also be close to each other in the vector space (also indicating a similarity of usage characteristics). In the top portion of the illustration, words "writer," "composer" and "drafter" are located near each other, indicating that those three words are used similarly in the word data used to generate the vectors of FIG. 4. Similarly, the words "writing," "composing" and "drafting" are also located near each other, also indicating that those three words are used similarly. The words "write," "compose," and "draft" are not as close in the illustration, with "draft" in particular being located farther away from "write" and "compose" than those words are to each other. This distance may be due to other uses of the word "draft" that may differ from "write" and "compose," for example, "draft" has a known noun form, where the "write" and "compose" do not and "draft" may also have other meanings (such as a cold interior breeze) that differ from "write" and "compose."

Further, the variations of the words (save for "draft") have similar usage relationships relative to each other. For example, the usage relationships of "write" to "writer" to "writing" is similar to the usage relationship between "compose" to "composer" to "composing" as shown by the lines connecting those triplets of words. Other, non-illustrated variations may also exist (such as "writes," "drafted," etc.) with their own vectors and usage relationships to other words.

Words in the bottom corner of FIG. 4 exhibit similar relationships to each other as the words discussed above.

The words "drink" and "eat" have different meanings, but similar usages as illustrated. Further, the usage relationships of "drink" to "drinker" to "drinking" are similar to the relationships of "eat" to "eater" to "eating." Also, "drink" shows a similar usage to "eat," "drinker" shows a similar usage to "eater" and "drinking" shows a similar usage to "eating." As "eat," "eater," and "eating" are all variations of a first word root, and "drink," "drinker," and "drinking" are all variations of a second word root, the system may use the usage relationships of these words to create new variations of another new word that shares usage with one of the variation forms. Thus, if a new word is found that is similar in usage to "eat" and/or "drink" the system may infer that the new word may have a variation of the form "x-er" or "x-ing" where x is the root of the new word. That is, if a vector corresponding to a new word is within a threshold distance to "eat" and/or "drink" the system may determine that the new word is used similarly to "eat" and/or "drink" and may create variations for the new word based on the variations of "eat" and/or "drink." Various known techniques, such as Cosine distance, Euclidean distance, Manhattan distance or other techniques may be used for determining a difference between word usage, or word usage vectors. Known techniques such as using a Levenshtein distance may be used for determining a difference between text strings.

Another feature of the indexed data that may be determined is any subject-verb-object (SVO) or subject-relation-object triples included in the particular text segment. A triple is three expressions that give some sense of the syntactic structure of the text segment. Each expression may be a single word or multiple words. For example, a subject may have several words that identify the subject entity. Identifying a triple in a text segment may be performed using known semantic analysis techniques, such as those currently used to parse questions for querying a knowledge base. While a triple may not be enough to the entire semantic content of a text segment, the triple may impart some information that can be useful in identifying a text segment to answer a particular question. Any triple(s) identified for a particular text segment may be indexed along with the text segment as part of the feature data. One feature may include entity and relation mentions. Another feature that may be indexed for a text segment are any keywords included in the text segment. For example, words that may be useful in determining the subject of a text segment may be identified and indexed. Various known techniques for identifying keywords within a text segment may be used. Another feature that may be indexed is information about the source of the text segment (such as the identity of the data source 180, the location of the text segment on the Internet or within the data source 180, etc.). Another feature that may be indexed is dependency information about the word(s) of the text segment. Dependency information indicates how a word or word string relates to other words or word strings as those word(s)/word string(s) are used, i.e., how certain word(s)/word string(s) depend on other word(s)/word string(s) in usage. This information may also be referred to as dependency parsing. Other feature data may also be used.

Figure 5A:
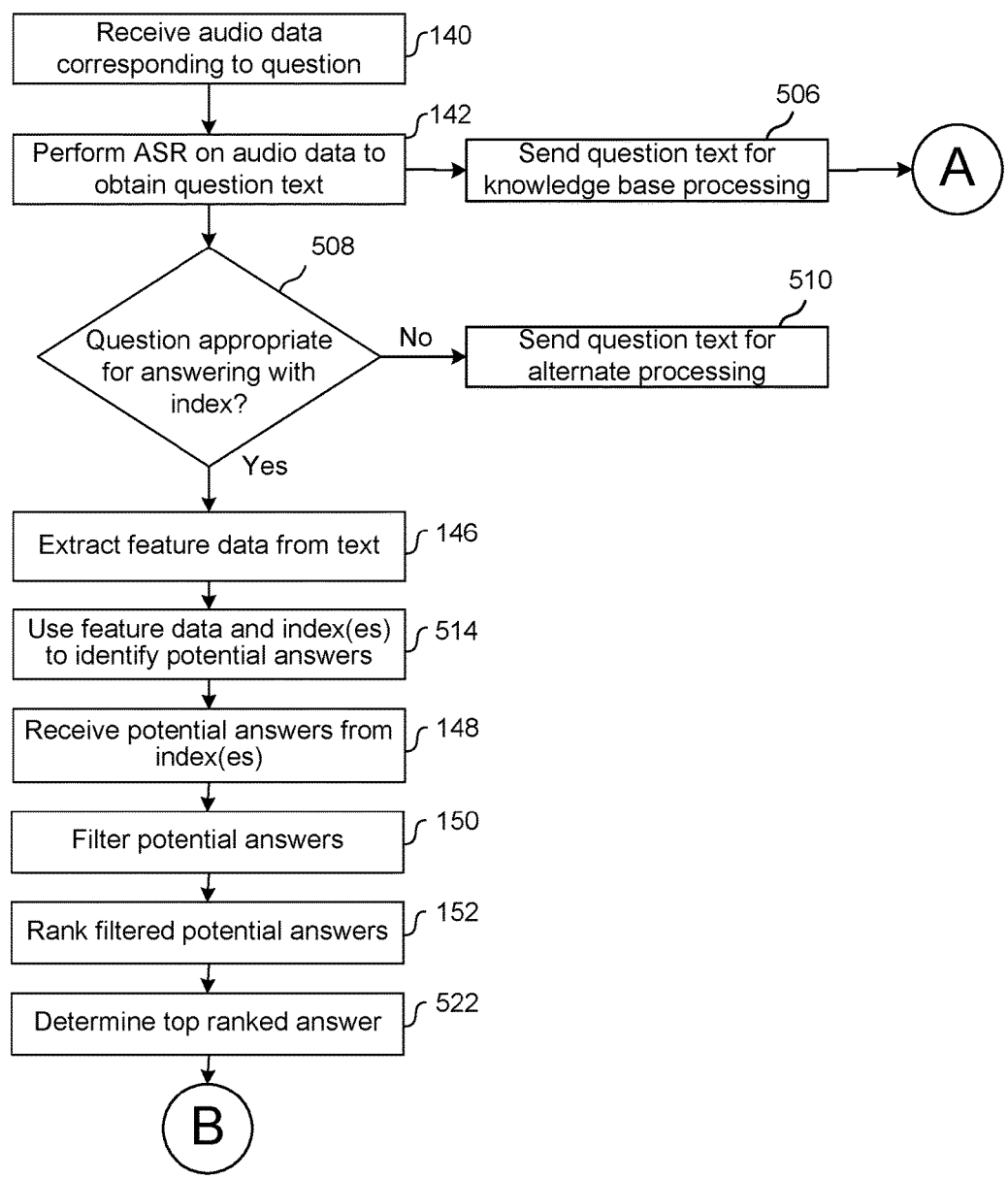
FIGS. 5A-5B are a flow charts illustrating quasi-semantic question answering according to embodiments of the present disclosure.
Figure 5B:
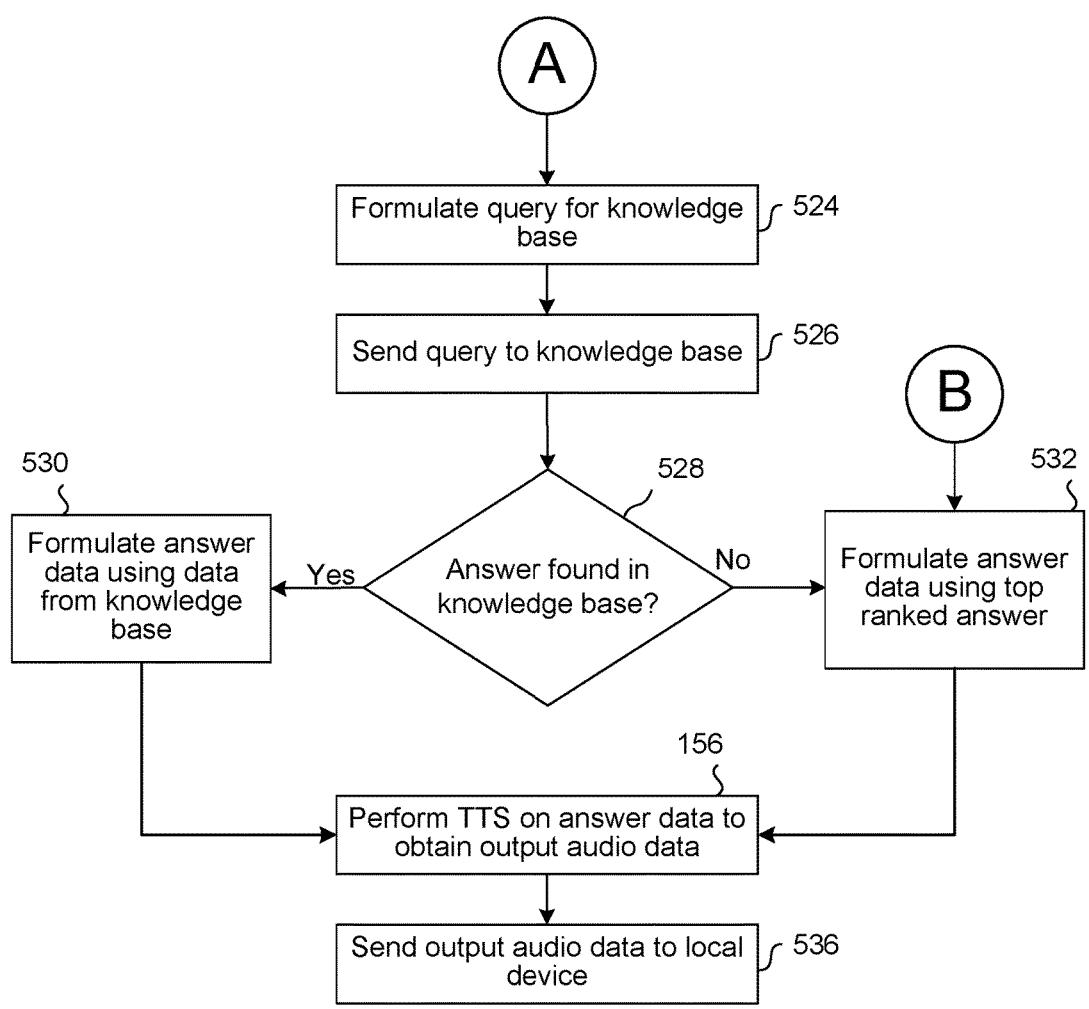

Once the data indexing is complete, the system may operate the alternate question answering at runtime to process user questions. As illustrated in FIG. 5A, a system may receive (140) audio data corresponding to a question. The system may then perform (142) ASR on the audio data to obtain the question text. The system may send (506) the question text for knowledge base processing to determine if the knowledge base can answer the user's question. As part of the knowledge base processing, as shown in FIG. 5B, the system may formulate (524) a query for the knowledge base using the question text and send (526). If the knowledge base can answer the question (528: Yes) the system may formulate answer data using data from the knowledge base. For voice-interactive systems the system may then perform (156) TTS on the answer data to obtain output audio data and may send (536) the output audio data to a local device so the local device may output speech corresponding to the answer to the question. If, however, the knowledge base cannot provide an answer to the question (528: No) the system may rely on the alternate question answering approach that uses the data indexes 190. Alternatively, the knowledge base may attempt to answer the user's question and may even provide an answer with an assigned confidence score. The confidence score of the knowledge base answer may be compared with a confidence score of an answer provided by using the data index, and the answer with the highest confidence may be used to answer the user's question. Alternatively, if the knowledge base answer does not have a confidence score above a certain threshold, the system may use an answer obtained using the data index 190.

The alternate question answering approach illustrated further in FIG. 5A may be performed substantially in parallel (i.e., at least partially at the same time) to querying the knowledge base to reduce latency in the event a knowledge base answer is unavailable (or is not associated with a sufficient confidence score). As shown in FIG. 5A, the system may determine whether the incoming question is appropriate for the question answering system. As certain kinds of questions may be more suited to being answered using the data index 190 (such as complex questions, opinion questions, or the like), filtering out less appropriate questions may improve system performance. If a question is not suitable for answering using the data index (508: No) the question text may be sent (510) for alternate processing, which may include alternate techniques beyond the knowledge base or may involve simply returning to the user an indication that the system cannot answer the question.

To determine if the question is appropriate for answering using the index the system may train one or more machine learning models which may include a multi-class model, classifier, or multiple classifiers that may return a yes or no (or relative score) to indicate whether the incoming question text will be well handled by the system. The machine learning model(s) used for this stage may be trained on a training set of questions that are labelled either as suitable or not suitable for answering using the data index. In particular, the model(s) may be trained to identify questions that may be reliably answered based on the data stored in the data index 190. As further data is added to the data index, or as more training data becomes available, the model(s) may be updated/retrained to ensure proper operation of the system. The model(s) may operate (and be trained on) on question text and/or on feature data extracted from the question text. In certain instances, multiple models may be used where each model corresponds to a particular subject area/domain that is represented in the data indexes 190. If any of the models is used by the system to analyze the question text and results in a confidence score above a certain threshold, the system may determine the question is appropriate (508: Yes) for question answering using the index. The model that returns a highest score may be noted by the system and the corresponding data index 190 (or subject matter, etc.) may be used to answer the question as described below. The score may indicate a likely semantic overlap between the question and the information in the data indexes 190.

If the question is suitable (508: Yes) the system may extract (146) feature data from the question text. Alternatively, the feature data may be extracted earlier in the process and used to determine question suitability. Further, prior to feature data extraction certain question text may be removed (such as special characters, wakewords, or other information not useful for question answering). The feature data extracted from the text may be for features similar to those used to create the data index 190, for example word embeddings, triples (including triples with a missing object or subject), keywords, noun/verb phrases, word dependency data, or the like. Thus the feature data will represent values for different features of the question text. Thus feature data of the question text describes characteristics of the question text and the words of the question text.

Once feature data is extracted, the system may use (514) the feature data and the data indexes 190 to identify text segments as potential answers to the question. The system may also use the question text itself to form a standard query to be used to query the indexes. The system may thus use the question text and the feature data to examine what text segments share similar text and/or feature data to the question asked. Questions that are within a certain similarity to the question asked may be selected as potential answers. The system may then receive (148) the potential answers from the data index(es) 190.

Once potential answers are obtained, the system may filter (150) the potential answers to determine which returned text segments may correspond to appropriate answers to the original question. Thus the system may filter out potential answers that do not match well enough with the input question. Filtering of potential answers may be performed in many different ways, using various techniques such as NLP, machine learning approaches, heuristics, or others. Filtering may be done based on question type, for example, if a "how many" question is asked, does the potential answer text segment include a quantity, or if a "where" question is asked, does the potential answer text segment include a location, and so on. Question type may be determined using rules and/or using a machine learning classifier that is trained to identify different question types. Filtering may also be done based on a number of words overlapping in the question or the answer using an N-gram approach. Other machine learning models may be trained and used to compare potential answer suitability in the filtering phrase. One goal of the filtering step may be to remove potential answers that are unlikely to be correct, while the next step of ranking may be used to isolate the best of the more potentially correct answers. The filtering step may use one or more machine learning trained classifiers to assign a score to each potential answer, thus allowing the system to remove potential answers with scores below a threshold. The system may also apply multiple classifiers to each potential answer, where each classifier determines the potential answer's suitability on a certain metric(s) (for example, type match, noun match, text overlap match, entity overlap, etc.) and potential answers with insufficient scores using those classifiers are removed and not included in the ranking step. Further, potential answers may be removed for reasons such as shallow word texts, computational costs for processing a particular answer, or other reasons.

Once potential answers are filtered, a more finely grained (and potentially computationally expensive) step of ranking may be performed where the system ranks (152) the filtered potential answers. As part of the ranking, different filtered potential answers are compared against each other to determine the most suitable answer relative to the input question. The ranking may also use a machine learning trained model/classifier where the model is trained on different answer texts, incoming question feature data and/or text, or the like. The ranking may account for noun overlap between a potential answer and a question, word dependencies between a potential answer and a question, or other factors. The input to the ranker may be the feature data and text of the filtered potential answers, the feature data and text of the incoming question and the different model(s)/classifier(s) used to make the ranking decision. The output of the ranking may include an orders list of the top N potential answers or simply the text segment of the top scoring answer. Thus the ranker may determine (522) the top ranked answer. The ranker may also output a confidence of the top scoring answer that may be used to compare against the confidence of an answer obtained using the knowledge base. Referring again to FIG. 5B, if no answer is found in the knowledge base (528: No) or if the knowledge base answer has a low confidence, the system may formulate (532) answer data using the top ranked answer, perform (156) TTS on the answer data to obtain output audio data and send (536) the output audio data to the local device. Alternatively, the system may compare a knowledge base answer and the top ranked answer based on some suitability metric to the original query and use the most suitable for the answer data. Alternatively, the server may send the output audio data to a different device than the device that captured the user's original question. The different device may be associated with the user, for example in a user account. Thus, the user may speak a question to one device (for example, local device 110) but the answer may be output through a different device (for example, a mobile device such as a phone, tablet, etc.).

Thus the system may start with input audio corresponding to a question and a universe of text segments in a data index and may identify a large group of potential answers, filter those potential answers into a smaller number, then rank the smaller number to obtain the final answer. In this manner the system narrows the entire universe of text segments stored in the data index to the top scoring answer. Components for performing this process is illustrated in FIG. 6. The input question text 602 may be processed by a question feature extractor 604 to extract (146) the question feature data 608. The question filter 610 inputs the question text 602 and/or the question feature data 608 and processes them using the question filter classifier(s) 612 to determine (508) if the question is appropriate for answering with the index. The index searching module 620 inputs the question text 602 and/or the question feature data 608 and compares them to the data index(es) 190 to identify (514) potential answers 622 to the question. The potential answers 622 are text segments obtained from data source(s) 180 and stored in the data index(es) 190. The answer filter 630 inputs the potential answers 622 and processes them using the answer filter classifier(s) 632 to filter (150) the potential answers 622 into a group of filtered answers 634 (which is smaller than the group of potential answers 622). The filtered answers 634 are then input into the answer ranker 640 which processes them using the answer ranker 642 to rank (152) the filtered potential answers 634 and determine (522) the top ranked answer 644. In one embodiment, the text segment corresponding to the top answer may then be synthesized (156) and the results sent (536) to the local device for speech output to the user.

In this embodiment the text segment of the top answer (which came directly from some data source 180) may be spoken back to the user. Thus the user receives a spoken response corresponding to the text segment that was in the data index (which may, for example, be a sentence that was found on the Internet, was indexed, and was found to correspond to the question). For example, if the question asked was "how many black keys are there on a piano," the system may synthesize the text segment corresponding to the top ranked answer as found in a data source (for example, "Almost every modern piano has 52 white keys and 36 black keys for a total of 88 keys") back to the user.

In another embodiment, however, the top ranked answer 644 may be sent to a formatter 650 which may formulate (532) answer data using the text segment of the top answer. The formatter 650 may use a formatter model 652, which is a machine learning trained model configured to place the words of the text segment in a form that matches the input question text 602. Thus the formatter 650 may take the text segment corresponding to the top ranked answer and may reformulate that text segment in a manner that more naturally answers the question as posed by the user. For example, if the question asked was "how many black keys are there on a piano," the system may take the text segment of the answer ("Almost every modern piano has 52 white keys and 36 black keys for a total of 88 keys"), reformat it, construct answer data more closely corresponding to the form of the question (for example, "there are 36 black keys on a piano") and may synthesize the reformatted answer for eventual output to the user.

The formatter 650 and/or formatter model 652 may be configured to operate on many different question types and may be particularly configured to output data in a voice-controlled system, where the eventual output to the user is known a priori to be synthesized speech. Thus the formatter 650 may remove extraneous text from the text segment and make the answer more efficient and more pleasing for a user of a voice-controlled question answering system. The formatter 650 and/or formatter model 652 may attempt to create answer data with some syntactic similarity to the question and may even insert data not included in the text segment (such as the user's name or other information) to make the answer experience pleasing to the user.

Thus the present system offers a method for answering user questions in a voice-controlled environment that improves upon existing web search technology, which simply returns a list of links unsuitable for voice-based exchanges. Further, web searches are usually keyword based and may not perform the feature data extraction and analysis that provide the present system with its quasi-semantic approach to question answering. The present system is also more robust than a knowledge base system alone, as such systems are limited in the information they can provide. Although illustrated as being used with a voice-controlled question answering system, it may also be used with a non-voice controlled system.

Various machine learning techniques may be used to perform the training of the various classifiers and models discussed above. Models may be trained and operated according to various machine learning techniques. Such techniques may include, for example, neural networks (such as deep neural networks and/or recurrent neural networks), inference engines, trained classifiers, etc. Examples of trained classifiers include conditional random fields (CRF) classifiers, Support Vector Machines (SVMs), neural networks (such as deep neural networks and/or recurrent neural networks), decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques. Many different training examples may be used to perform the training discussed herein.

Figure 7:
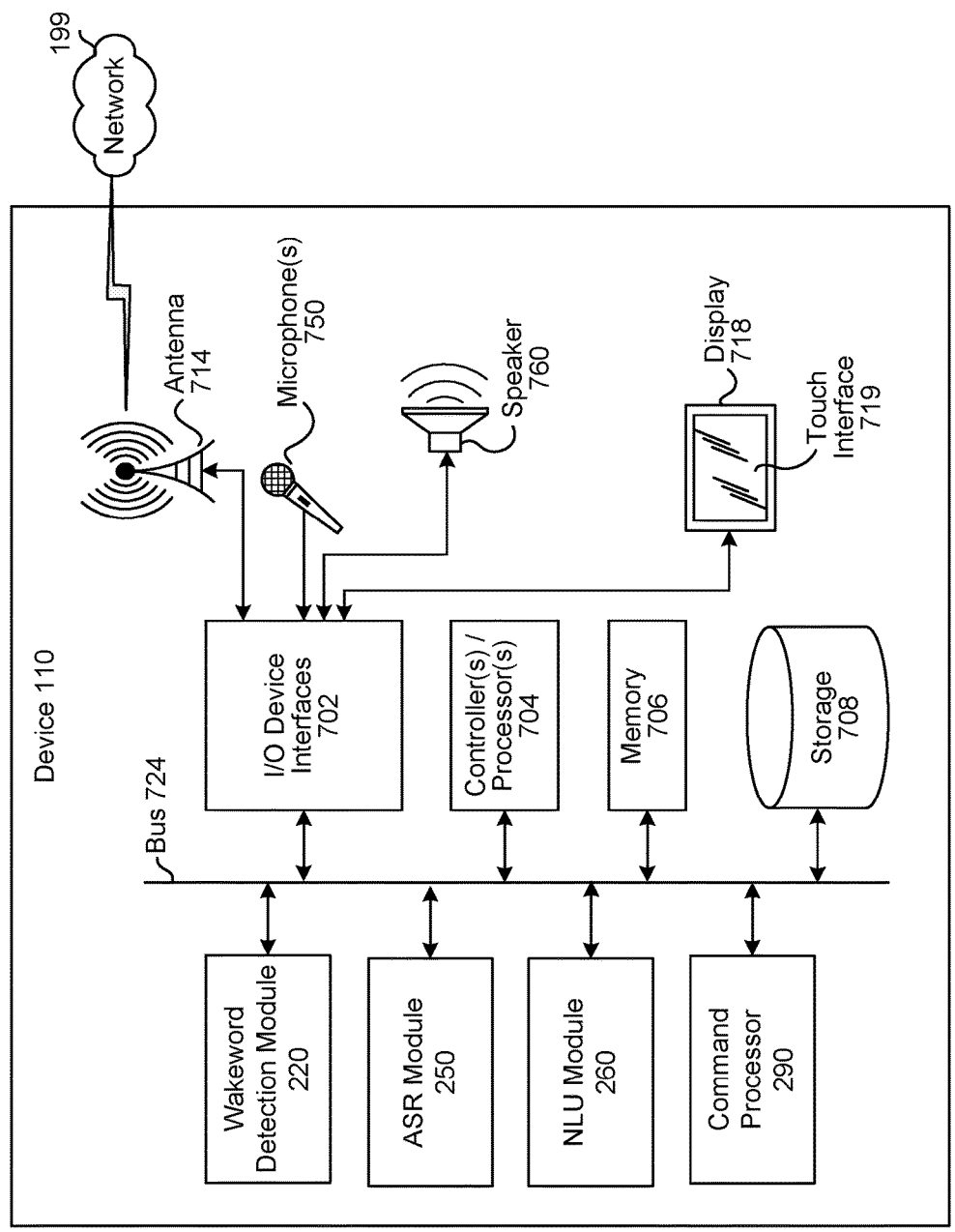
FIG. 7 is a block diagram conceptually illustrating example components of a device according to embodiments of the present disclosure.
Figure 8:
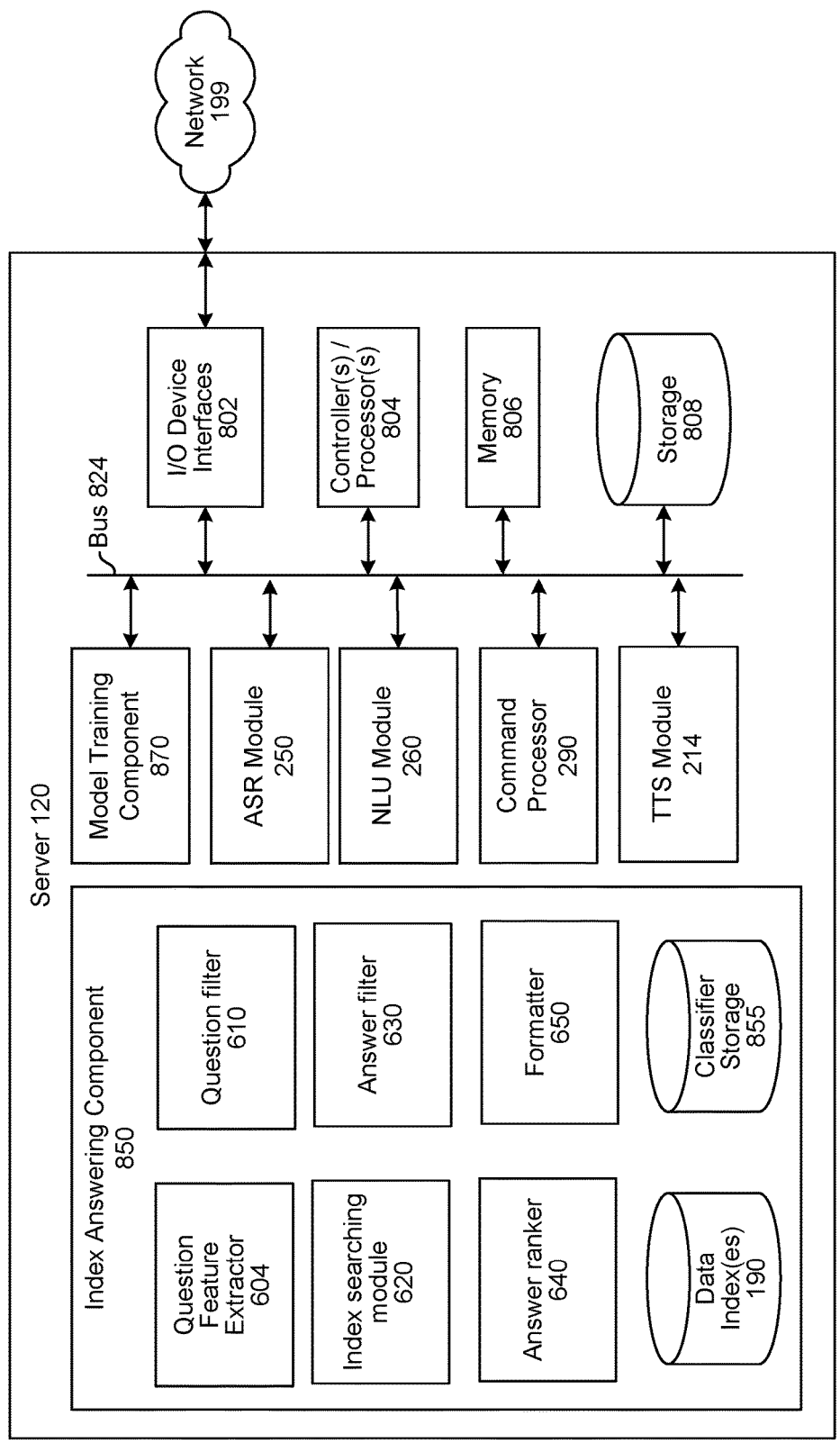
FIG. 8 is a block diagram conceptually illustrating example components of a server according to embodiments of the present disclosure.

FIG. 7 is a block diagram conceptually illustrating a local device 110 that may be used with the described system. FIG. 8 is a block diagram conceptually illustrating example components of a remote device, such as a remote server 120 that may assist with ASR, NLU processing, or command processing. Multiple such servers 120 may be included in the system, such as one server(s) 120 for training ASR models, one server(s) for performing ASR, one server(s) 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (704/804), that may each include a central processing unit (CPU) for processing data and computer-readable instructions, and a memory (706/806) for storing data and instructions of the respective device. The memories (706/806) may individually include volatile random access memory (RAM), non-volatile read only memory (ROM), non-volatile magnetoresistive (MRAM) and/or other types of memory. Each device may also include a data storage component (708/808), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (702/802).

Computer instructions for operating each device (110/120) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (110/120) includes input/output device interfaces (702/802). A variety of components may be connected through the input/output device interfaces, as will be discussed further below. Additionally, each device (110/120) may include an address/data bus (724/824) for conveying data among components of the respective device. Each component within a device (110/120) may also be directly connected to other components in addition to (or instead of) being connected to other components across the bus (724/824).

Referring to the device 110 of FIG. 7, the device 110 may include a display 718, which may comprise a touch interface 719. Or the device 110 may be "headless" and may primarily rely on spoken commands for input. As a way of indicating to a user that a connection between another device has been opened, the device 110 may be configured with a visual indicator, such as an LED or similar component (not illustrated), that may change color, flash, or otherwise provide visual indications by the device 110. The device 110 may also include input/output device interfaces 702 that connect to a variety of components such as an audio output component such as a speaker 760, a wired headset or a wireless headset (not illustrated) or other component capable of outputting audio. The device 110 may also include an audio capture component. The audio capture component may be, for example, a microphone 750 or array of microphones, a wired headset or a wireless headset (not illustrated), etc. The microphone 750 may be configured to capture audio. If an array of microphones is included, approximate distance to a sound's point of origin may be performed acoustic localization based on time and amplitude differences between sounds captured by different microphones of the array. The device 110 (using microphone 750, wakeword detection module 220, ASR module 250, etc.) may be configured to determine audio data corresponding to detected audio data. The device 110 (using input/output device interfaces 702, antenna 714, etc.) may also be configured to transmit the audio data to server 120 for further processing or to process the data using internal components such as a wakeword detection module 220.

For example, via the antenna(s), the input/output device interfaces 702 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The device 110 and/or server 120 may include an ASR module 250. The ASR module in device 110 may be of limited or extended capabilities. The ASR module 250 may include the language models 254 stored in ASR model storage component 252, and an ASR module 250 that performs the automatic speech recognition process. If limited speech recognition is included, the ASR module 250 may be configured to identify a limited number of words, such as keywords detected by the device, whereas extended speech recognition may be configured to recognize a much larger range of words.

The device 110 and/or server 120 may include a limited or extended NLU module 260. The NLU module in device 110 may be of limited or extended capabilities. The NLU module 260 may comprising the name entity recognition module 262, the intent classification module 264 and/or other components. The NLU module 260 may also include a stored knowledge base and/or entity library, or those storages may be separately located.

The device 110 and/or server 120 may also include a command processor 290 that is configured to execute commands/functions associated with a spoken command as described above.

The server 120 (and potentially the device 110 as well) may also include a TTS module 214 to process text into speech for use with the voice controlled interface or other features of the system 100.

The device 110 may include a wakeword detection module 220, which may be a separate component or may be included in an ASR module 250. The wakeword detection module 220 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques in the art of keyword detection (also known as keyword spotting) may also be used. In some embodiments, the device 110 may be configured collectively to identify a set of the directional audio signals in which the wake expression is detected or in which the wake expression is likely to have occurred.

The wakeword detection module 220 receives captured audio and processes the audio (for example, using model(s) 232) to determine whether the audio corresponds to particular keywords recognizable by the device 110 and/or system 100. The storage 708 may store data relating to keywords and functions to enable the wakeword detection module 220 to perform the algorithms and methods described above. The locally stored speech models may be pre-configured based on known information, prior to the device 110 being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 110 prior to the user device 110 being delivered to the user or configured to access the network by the user. The wakeword detection module 220 may access the storage 708 and compare the captured audio to the stored models and audio sequences using audio comparison, pattern recognition, keyword spotting, audio signature, and/or other audio processing techniques.

The server may include a model training component 870. The model training component may be used to train the classifier(s)/models discussed above.

The server may also include an index answering component 850 that can operate to answer queries using the methods disclosed here. The index answering component 850 may include a question feature extractor 604, a question filter 610, an index searching module 620, an answer filter 630, an answer ranker 640, a formatter 650, the data index(es) 190 (which may also be stored with storage 808) and classifier storage 855 which may store the machine trained model(s)/classifier(s) used to operate the present system, including but not limited to question filter classifier(s) 612, answer filter classifier(s) 632, answer ranker 642, and formatter model 652.

As noted above, multiple devices may be employed in a single speech processing system. In such a multi-device system, each of the devices may include different components for performing different aspects of the speech processing. The multiple devices may include overlapping components. The components of the devices 110 and server 120, as illustrated in FIGS. 7 and 8, are exemplary, and may be located a stand-alone device or may be included, in whole or in part, as a component of a larger device or system.

Figure 9:
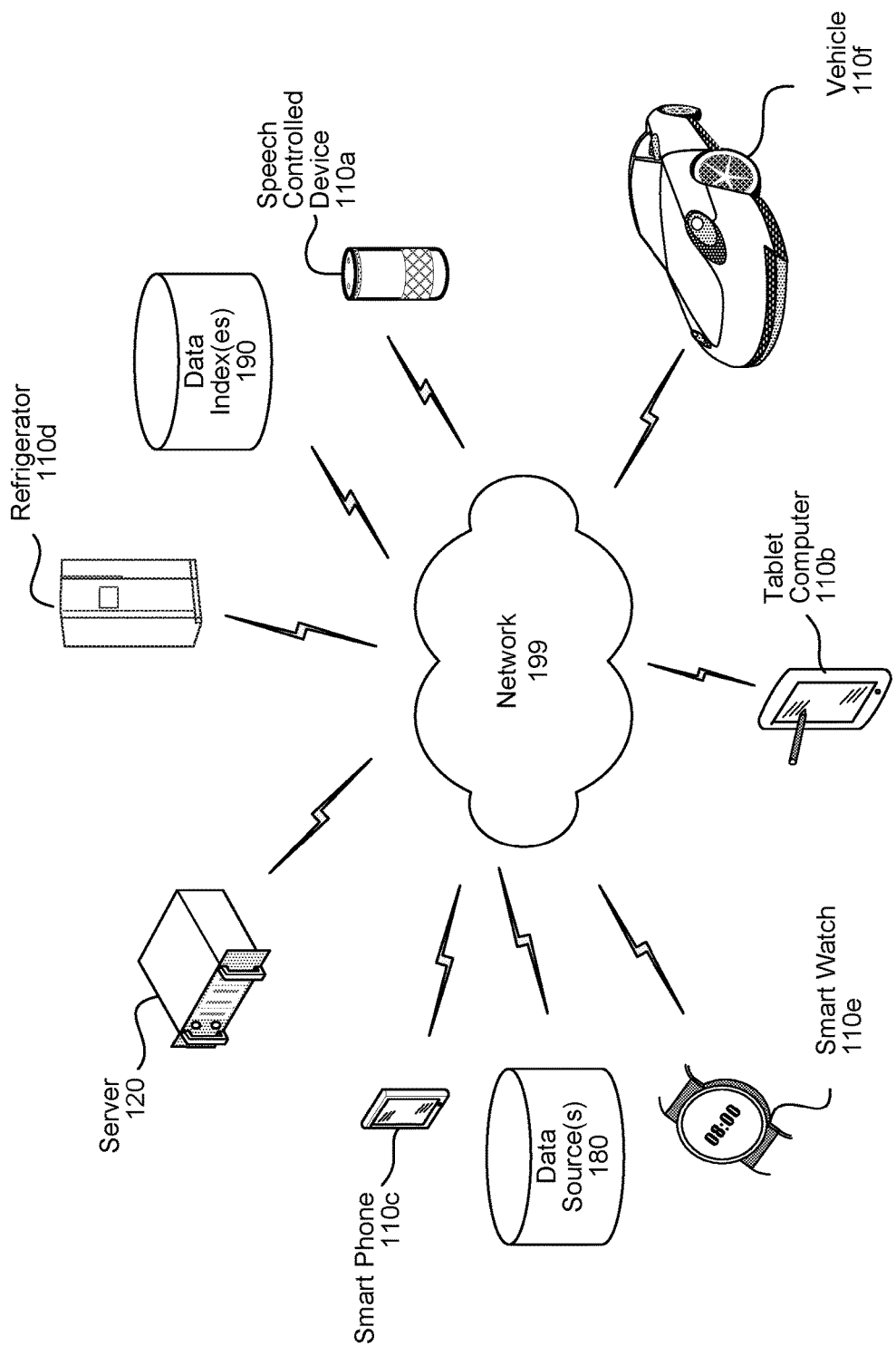
FIG. 9 illustrates an example of a computer network for use with the system.

As illustrated in FIG. 9 multiple devices (120, 120x, 110a to 110f) may contain components of the system 100 and the devices may be connected over a network 199. Network 199 may include a local or private network or may include a wide network such as the internet. Devices may be connected to the network 199 through either wired or wireless connections. For example, a speech controlled device 110a, a tablet computer 110b, a smart phone 110c, a refrigerator 110d, a smart watch 110e, and/or a vehicle 110f may be connected to the network 199 through a wireless service provider, over a WiFi or cellular network connection or the like. Other devices are included as network-connected support devices, such as a server 120, application developer devices 120x, or others. The support devices may connect to the network 199 through a wired connection or wireless connection. Networked devices 110 may capture audio using one-or-more built-in or connected microphones 750 or audio capture devices, with processing performed by ASR, NLU, or other components of the same device or another device connected via network 199, such as an ASR 250, NLU 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented as in firmware or hardware, such as the acoustic front end 256, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer implemented method comprising:
    receiving, from a first device, audio data representing a user question;
    performing speech recognition on the audio data to obtain question text;
    processing the question text with a first trained model to determine that a data index is suitable for answering the question, the data index comprising a plurality of text segments including a first text segment representing a sentence obtained from the internet;
    determining first feature data representing characteristics of the question text;
    identifying, using the first feature data and the data index, a first plurality of candidate text segments as potentially including information responsive to the question;
    identifying, using the first feature data and a second trained model, a second plurality of candidate text segments, wherein the second plurality is a subset of the first plurality;
    ranking, using the first feature data and a third trained model, the second plurality of candidate text segments to identify a top ranked candidate text segment that is determined to be most likely to include information responsive to the question;
    performing text-to-speech processing on the top ranked candidate text segment to obtain output audio data; and
    sending the output audio data to the first device.

2. The computer implemented method of claim 1, further comprising, prior to receiving the audio data:
    identifying a first data source on the internet;
    identifying a first text segment in the first data source;
    determining second feature data describing characteristics of the first text segment;
    identifying a second data source on the internet;
    identifying a second text segment in the second data source;
    determining third feature data describing characteristics of the second text segment; and
    storing the first text segment, second feature data, second text segment and third feature data in the data index, wherein the first text segment is the top ranked candidate text segment.

3. The computer implemented method of claim 2, further comprising, wherein:
    the identifying of the first plurality of candidate text segments further uses the second feature data and the third feature data; and
    the ranking of the second plurality of candidate text segments further uses the second feature data.

4. The computer implemented method of claim 1, further comprising, prior to performing the text-to-speech processing:
    determining a knowledge base query from the question text;
    sending the knowledge base query to a knowledge base; and
    determining that the question is not answerable using the knowledge base.

5. A computer implemented method comprising:
determining input text representing a question;
processing the input text to determine a data index is suitable for answering the question;
determining first feature data corresponding to characteristics of the input text;
identifying, using the feature data, a first plurality of candidate text segments from a plurality of text segments stored in the data index, the first plurality of candidate text segments potentially including information responsive to the question;
determining a portion of the first plurality of candidate text segments that is a subset of the plurality of candidate text segments;
selecting, using at least one trained machine learning model, from the portion of the first plurality of candidate text segments, a first text segment likely to include the information responsive to the question; and
determining output data using the first text segment.

6. The computer implemented method of claim 5, further comprising:
identifying, using the first feature data and a second trained machine learning model, a second plurality of candidate text segments, wherein the second plurality is a second subset of the first plurality; and
ranking, using the first feature data and a third trained model, the second plurality to identify the first text segment.

7. The computer implemented method of claim 5, further comprising, prior to determining the input text:
identifying a first data source;
identifying the first text segment in the first data source;
determining second feature data describing characteristics of the first text segment;
identifying a second data source;
identifying a second text segment in the second data source;
determining third feature data describing characteristics of the second text segment; and
storing the first text segment, second feature data, second text segment and third feature data in the data index,
wherein the identifying the first plurality of candidate text segments further uses the second feature data and third feature data.

8. The computer implemented method of claim 5, wherein the first feature data comprises at least one of:
a subject-verb-object triple determined from the input text;
a word embedding representing usage of a first word in a word corpus, the first word included in the input text; and
a word dependency representing a relationship of a first word string to a second word string, the first word string included in the input text.

9. The computer implemented method of claim 5, further comprising:
determining, prior to or at substantially the same time as the identifying, that the question is not answerable using a knowledge base.

10. The computer implemented method of claim 5, further comprising:
receiving, from a first device, audio data;
performing speech recognition on the audio data to obtain the input text;
performing text-to-speech processing on the output data to obtain output audio data; and
sending the output audio data to the first device.

11. The computer implemented method of claim 10, wherein the output data is the first text segment.

12. The computer implemented method of claim 10, further comprising:
determining, using the input text, a form of the question; and
configuring the output data using the form of the question.

13. A computing system comprising:
at least one processor; and
a memory including instructions operable to be executed by the at least one processor to configure the system to:
determine input text representing a question;
process the input text to determine a data index is suitable for answering the question;
determine first feature data corresponding to characteristics of the input text;
identify, using the feature data, a first plurality of candidate text segments from a plurality of text segments stored in the data index, the first plurality of candidate text segments potentially including information responsive to the question;
determine a portion of the first plurality of candidate text segments that is a subset of the plurality of candidate text segments;
select, using at least one trained machine learning model, from the portion of the first plurality of candidate text segments, a first text segment likely to include the information responsive to the question; and
determine output data using the first text segment.

14. The computing system of claim 13, wherein the at least one memory further includes instructions that, when executed by the at least one processor, further cause the system to:
identify, using the first feature data and a second trained machine learning model, a second plurality of candidate text segments, wherein the second plurality is a second subset of the first plurality; and
rank, using the first feature data and a third trained model, the second plurality to identify the first text segment.

15. The computing system of claim 13, wherein the at least one memory further includes instructions that, when executed by the at least one processor, further cause the system to, prior to determining the input text:
identify a first data source;
identify the first text segment in the first data source;
determine second feature data describing characteristics of the first text segment;
identify a second data source;
identify a second text segment in the second data source;
determine third feature data describing characteristics of the second text segment; and
store the first text segment, second feature data, second text segment and third feature data in the data index,
wherein the system is configured to identify the first plurality of candidate text segments further using the second feature data and third feature data.

16. The computing system of claim 13, wherein the first feature data comprises at least one of:
a subject-verb-object triple determined from the input text;
a word embedding representing usage of a first word in a word corpus, the first word included in the input text; and
a word dependency representing a relationship of a first word string to a second word string, the first word string included in the input text.

17. The computing system of claim 13, wherein the at least one memory further includes instructions that, when executed by the at least one processor, further cause the system to determine, prior to or at substantially the same time as the system is configured to identify, that the question is not answerable using a knowledge base.

18. The computing system of claim 13, wherein the at least one memory further includes instructions that, when executed by the at least one processor, further cause the system to:
   receive, from a first device, audio data;
   perform speech recognition on the audio data to obtain the input text;
   perform text-to-speech processing on the output data to obtain output audio data; and
   send the output audio data to the first device.

19. The computing system of claim 18, wherein the output data is the first text segment.

20. The computing system of claim 18, wherein the at least one memory further includes instructions that, when executed by the at least one processor, further cause the system to:
   determine, using the input text, a form of the question; and
   configure the output data using the form of the question.

* * * * *